United States Patent [19]
Townsend

[11] Patent Number: 5,908,216
[45] Date of Patent: *Jun. 1, 1999

[54] SIDE INTRUSION BEAM WITH FOUR POINTS OF CONNECTION

[75] Inventor: John A. Townsend, Bloomfield, Mich.

[73] Assignee: Joalto Design, Inc., Southfield, Mich.

[ * ] Notice: This patent is subject to a terminal disclaimer.

[21] Appl. No.: 08/829,460

[22] Filed: Mar. 28, 1997

Related U.S. Application Data

[63] Continuation-in-part of application No. 08/577,649, Dec. 22, 1995, Pat. No. 5,806,917.

[51] Int. Cl.$^6$ ........................................................... B60J 5/04
[52] U.S. Cl. ................................ 296/146.6; 296/146.5; 296/146.9; 296/188; 296/202
[58] Field of Search ............................. 296/146.2, 146.5, 296/146.9, 146.11, 188, 189, 202, 146.6; 49/502

[56] References Cited

U.S. PATENT DOCUMENTS

| | | | |
|---|---|---|---|
| 2,650,857 | 9/1953 | Watter et al. .............................. | 49/502 |
| 2,651,541 | 9/1953 | Surles ...................................... | 296/155 |
| 2,785,921 | 3/1957 | Barenyi ................................... | 296/188 |
| 2,819,114 | 1/1958 | Lake ....................................... | 296/155 |
| 3,718,364 | 2/1973 | Fisher et al. . | |
| 3,788,686 | 1/1974 | Rossie et al. ........................ | 296/146.6 |
| 3,819,228 | 6/1974 | Cornacchia ........................... | 296/146.9 |
| 3,887,227 | 6/1975 | Deckert ................................... | 296/188 |
| 4,090,734 | 5/1978 | Inami et al. ............................. | 296/146 |
| 4,750,779 | 6/1988 | Van Rooij ................................ | 296/188 |
| 4,801,172 | 1/1989 | Townsend ................................ | 296/155 |
| 4,940,282 | 7/1990 | Townsend ................................ | 296/204 |
| 4,969,680 | 11/1990 | Shimoda .............................. | 296/146.6 |
| 5,137,325 | 8/1992 | Ohya ..................................... | 296/146.6 |
| 5,224,752 | 7/1993 | Marshall ................................. | 296/188 |
| 5,297,841 | 3/1994 | Sleolecki ............................... | 296/146.6 |
| 5,306,067 | 4/1994 | Hull et al. ............................ | 296/146.6 |
| 5,348,342 | 9/1994 | Haland et al. . | |
| 5,364,157 | 11/1994 | Siedlecki ............................. | 296/146.6 |
| 5,431,476 | 7/1995 | Torigaki .................................. | 296/188 |
| 5,518,290 | 5/1996 | Reinhard et al. .................... | 296/188 X |
| 5,524,960 | 6/1996 | Townsend ................................ | 296/155 |
| 5,605,371 | 2/1997 | Borchelt et al. ........................ | 296/188 |

FOREIGN PATENT DOCUMENTS

| | | |
|---|---|---|
| 493225 | 7/1992 | European Pat. Off. . |
| 961 405 | 5/1950 | France . |
| 1.013.189 | 7/1952 | France . |
| 1.026.247 | 4/1953 | France . |
| 2 478 718 | 3/1981 | France . |
| 895 409 | 11/1953 | Germany . |
| 1806716 | 11/1968 | Germany . |
| 2045875 | 3/1972 | Germany ............................. 296/146.6 |
| 2364632 | 12/1973 | Germany . |
| 4240416 | 9/1993 | Germany ............................. 296/146.6 |
| 613307 | 12/1960 | Italy . |
| 242592 | 6/1926 | United Kingdom . |
| 1085891 | 10/1967 | United Kingdom . |

*Primary Examiner*—Dennis H. Pedder
*Attorney, Agent, or Firm*—Rader, Fishman & Grauer PLLC

[57] ABSTRACT

A side intrusion beam is disclosed for mounting within a vehicle door to inhibit intrusion into the vehicle during a collision. The intrusion beam spans across substantially the entire main portion (i.e. non-window portion) of the door. Structural keys located on the four corners of the intrusion beam mate with complementary shaped receptacles on the door jamb when the door is closed to anchor the intrusion beam to the vehicle chassis. Preferably, the intrusion beam includes a framework of truss members which create an overall outwardly curved shape. In the preferred embodiment, the entire framework is constructed from two sheet metal stampings that are welded together, forming a void therebetween. A structural foam can be injected into the void to increase strength and deaden sound. The inventive intrusion beam can be used with conventionally hinged passenger doors (both front and rear), vertically sliding doors, rear minivan doors, utility vehicle lift-gates, tailgates, and cargo doors, trunks, sliding van doors, or any vehicle door opening where it is desired to limit intrusion into the vehicle during a collision.

37 Claims, 7 Drawing Sheets

SIDE INTRUSION BEAM WITH FOUR POINTS OF CONNECTION

CROSS-REFERENCE TO RELATED APPLICATION

This application is a continuation-in-part of U.S. application Ser. No. 08/577,649, filed Dec. 22, 1995, for INTEGRATED MOTOR VEHICLE DOOR AND CHASSIS, now U.S. Pat. No. 5,806,917. Priority of the filing date of said application is hereby claimed pursuant to 35 U.S.C. §120, and the disclosure of said application is hereby incorporated by reference.

BACKGROUND OF THE INVENTION

1. Field of the Invention

The present invention relates to motor vehicle chassis, and in particular to a side intrusion beam within a door which is structurally integrated with the chassis.

2. Discussion of the Prior Art

It has been previously proposed to structurally integrate a vertically sliding door into a vehicle chassis. This Door And Chassis Integration Technology (DACIT) as applied to vertically sliding doors is disclosed in the following U.S. Patents issued to John A. Townsend, incorporated herein by reference: U.S. Pat. No. 4,801,172 issued Jan. 31, 1989; U.S. Pat. No. 4,940,282 issued Jul. 10, 1990; U.S. Pat. No. 5,378,036 issued Jan. 3, 1995; and application Ser. No. 08/328,124 filed Oct. 20, 1994.

In operation, when the vertically sliding door which is the subject of the above patents is closed, structural key members located on the edges of the door engage with mating receptacles in the door jambs. In this position, each key member and mating receptacle pair is able to transmit compressive, tensile and torsional forces between the door and the vehicle chassis. The gap in the vehicle chassis structure that is created by the door opening is bridged by the door when it is in the closed position. This integrated chassis system that exists when the doors of the vehicle are closed provides a much stiffer vehicle frame and more fully surrounds the vehicle occupants to protect them from front, rear and side impact. The last issued patent above also teaches the use of a single, flat, side intrusion beam spanning across the door to inhibit intrusion to the vehicle during a side impact collision.

In a manner similar to that above, it has also been proposed to apply DACIT to conventional hinged vehicle doors. This concept is taught by the present inventor in U.S. application Ser. No. 08/577,649, filed Dec. 22, 1995, incorporated herein by reference. That application also discloses the use of two horizontal beams that span between the structural connections located adjacent to the four corners of the door. However, since no structural framework is located across the central portion of the door, the vehicle occupants are not fully protected from side impact intrusion.

Another example of a prior are side intrusion beam is shown in U.S. Pat. No. 3,887,227 issued to Deckert on Jul. 3, 1975. This apparatus employs tension members within a vehicle door that are tied to opposite sides of the door opening when the door is closed. However, these tension members only transmit tensile forces and are not capable of transmitting compressive or torsional forces across the door openings, which would be needed to reduce structural deformation during a front or rear end collision. These tension members also only cover a narrow portion of the door opening. Therefore, they may be wedged upward or downward by an impinging vehicle and may only provide limited protection in some collisions.

The above prior art side intrusion beams do not curve outward or inward as they span across the doorway, they have flat cross-sections, and they do not cover a large portion of the door. The prior art provides limited protection from intrusion during a side impact collision. Using the construction features of the prior art to create a door with increased intrusion protection would yield a door having increased weight and cost. Increasing the weight of a moving door and the overall weight and cost of a vehicle is often an unacceptable option in vehicle manufacture, and therefore a lower level of side intrusion protection is chosen instead.

What is needed and is not provided by the prior art is a side intrusion beam that efficiently provides a high level of side intrusion protection without adding excess weight, cost, size or complexity to the vehicle door.

SUMMARY OF THE INVENTION

The present invention provides a side intrusion beam that overcomes the disadvantages of the prior art discussed above. The side intrusion beam can be used in conjunction with a vertically sliding door, a conventional hinged door, a horizontally sliding van door, a rear tailgate, or any other type of vehicle door panel in which it is desirable to inhibit inward deformation during a collision.

In accordance with one aspect of the present invention, a disengageable structural connection is located at each of the four corners of the door for structurally connecting the side intrusion beam to the main chassis of the vehicle when the door is closed. In the preferred embodiment, wedge shaped structural keys are located at the top and bottom of both the forward and rearward edges of a conventional hinged door, facing inward. Mating receptacles are positioned in the front and rear door jambs facing outward towards the keys. When the door is closed, the keys engage the mating receptacles and form a tight fit therewith. The mating receptacles are structurally connected to the vehicle chassis, and the keys are structurally connected to side intrusion beam. Therefore, when the door is in a closed position, tensile, compressive, torsional and bending forces can be transmitted from the side intrusion beam to the chassis through the mating keys and receptacles. By taking advantage of the strength inherent in the vehicle chassis, the side impact beam can be made thinner and lighter than a beam that is not structurally tied to the vehicle chassis when the door is closed.

In accordance with another aspect of the present invention, the inventive side intrusion beam spans across essentially the entire door to interconnect the four disengageable structural connections. In the preferred embodiment, the side intrusion beam comprises a central portion in the middle of the door, four diagonal beams each interconnecting the central portion with one of the disengageable connections, front and rear vertical side beams each interconnecting adjacent connections, top and bottom horizontal beams each interconnecting adjacent connections, and two horizontal side beams each interconnecting the central portion with a mid-portion of one of the two vertical side beams. With this configuration, almost the entire portion of the door opening that is covered by the closed door is spanned by a structural framework that inhibits side intrusion. Collision forces that are received by the intrusion beam are distributed among the four disengageable structural connections.

In accordance with still another aspect of the present invention, a non-flat side intrusion beam is provided such that the beam has an increased resistance to bending without adding excess weight to the beam. In the preferred embodiment, each of the beams that make up the overall side intrusion beam have bends or curves along their length to produce a complex cross-section having a much greater overall depth than the thickness of the beam material. This allows for greater impact protection without adding weight to the vehicle door.

In accordance with yet another aspect of the present invention, an intrusion beam or frame having multiple members is formed from sheet metal stampings to create a single, unitary frame. In the preferred embodiment, the beam is formed by spot welding two stampings together. This type of construction yields much lower fabrication costs than if individual beams are constructed and then joined together. Holes in the sheet metal are punched out to reduce weight in areas that do not contribute much additional strength, and to provide access to other components located in the door. Alternatively, the side intrusion beam may be molded from carbon fiber or another strong, lightweight material to achieve additional weight savings.

In accordance with yet another aspect of the present invention, the side intrusion beam is arched either inward or outward to provide greater resistance to bending. In the preferred embodiment, the overall beam framework is arched outward both vertically and horizontally to form a dish-shape that is highly efficient structurally for its weight and size. This type of structure goes primarily into compression during a collision.

In accordance with yet another aspect of the present invention, the side intrusion beam is adapted to replace the inner panel of the door frame, for further reductions in weight, size, cost and complexity.

DETAILED DESCRIPTION OF THE PREFERRED EMBODIMENTS

Figure 1:
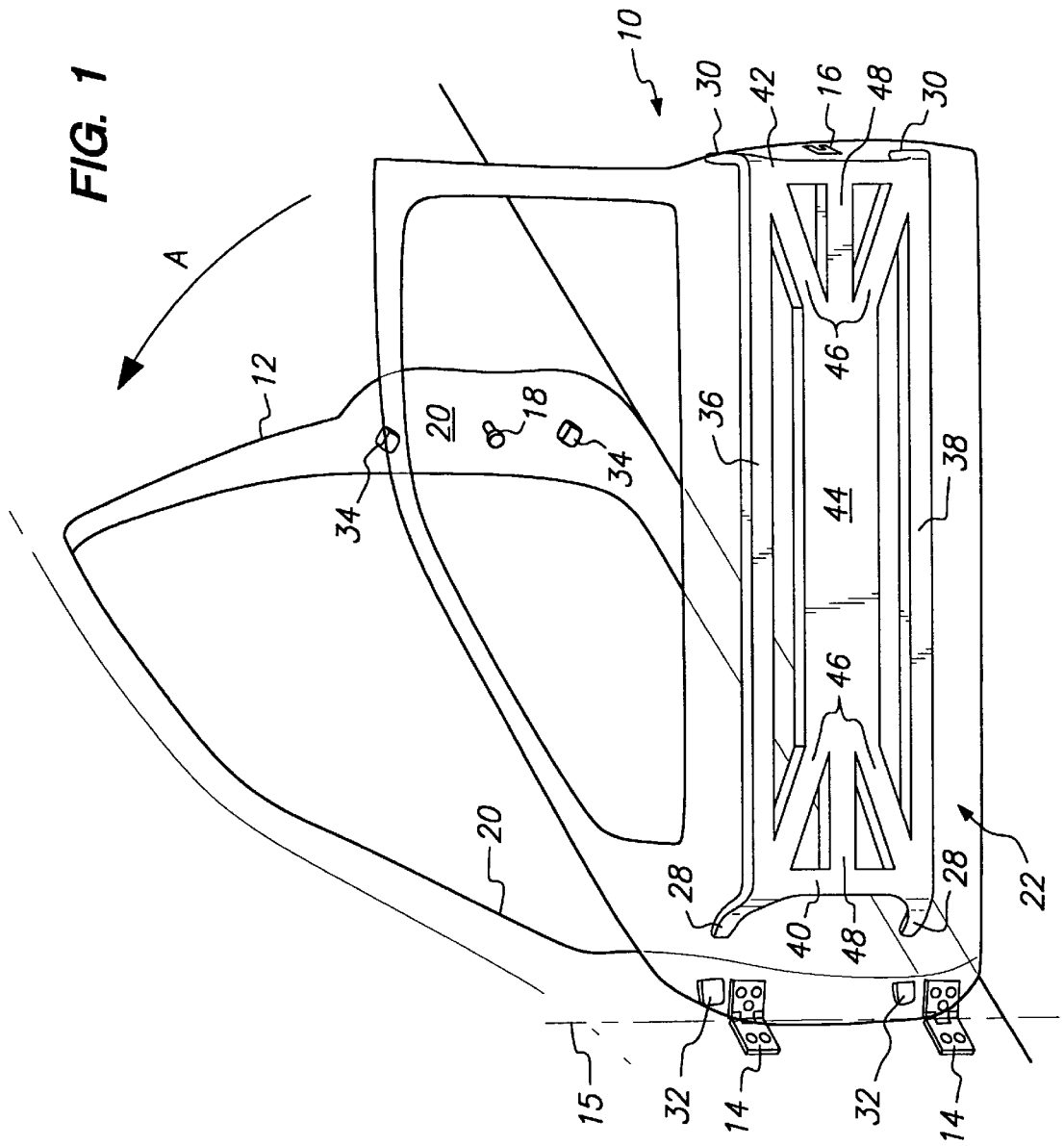
FIG. 1 is a perspective view schematically showing a general embodiment of the present invention applied to a conventional hinged, driver's-side vehicle door with the door shown in an open position.

Referring to FIG. 1, a general embodiment of the present invention is shown applied to a conventionally hinged door 10. Door 10 is pivotably connected to the vehicle body 12 by upper and lower hinges 14, and pivots about axis 15 which passes through hinges 14. Door 10 is shown in an open position and pivots about hinge axis 15 in the direction of Arrow A to a closed position. Door 10 is releasably held in the closed position by a conventional door catch 16 mounted on the rearward edge of door 12 which engages a post 18 mounted on the rear of door jamb 20.

Side intrusion beam or frame 22 is provided within door 10 to inhibit intrusion into the vehicle during a collision. Preferably, beam 22 covers as much of door 10 as possible, spanning between the four corners of the main portion of door 10.

Figure 2:
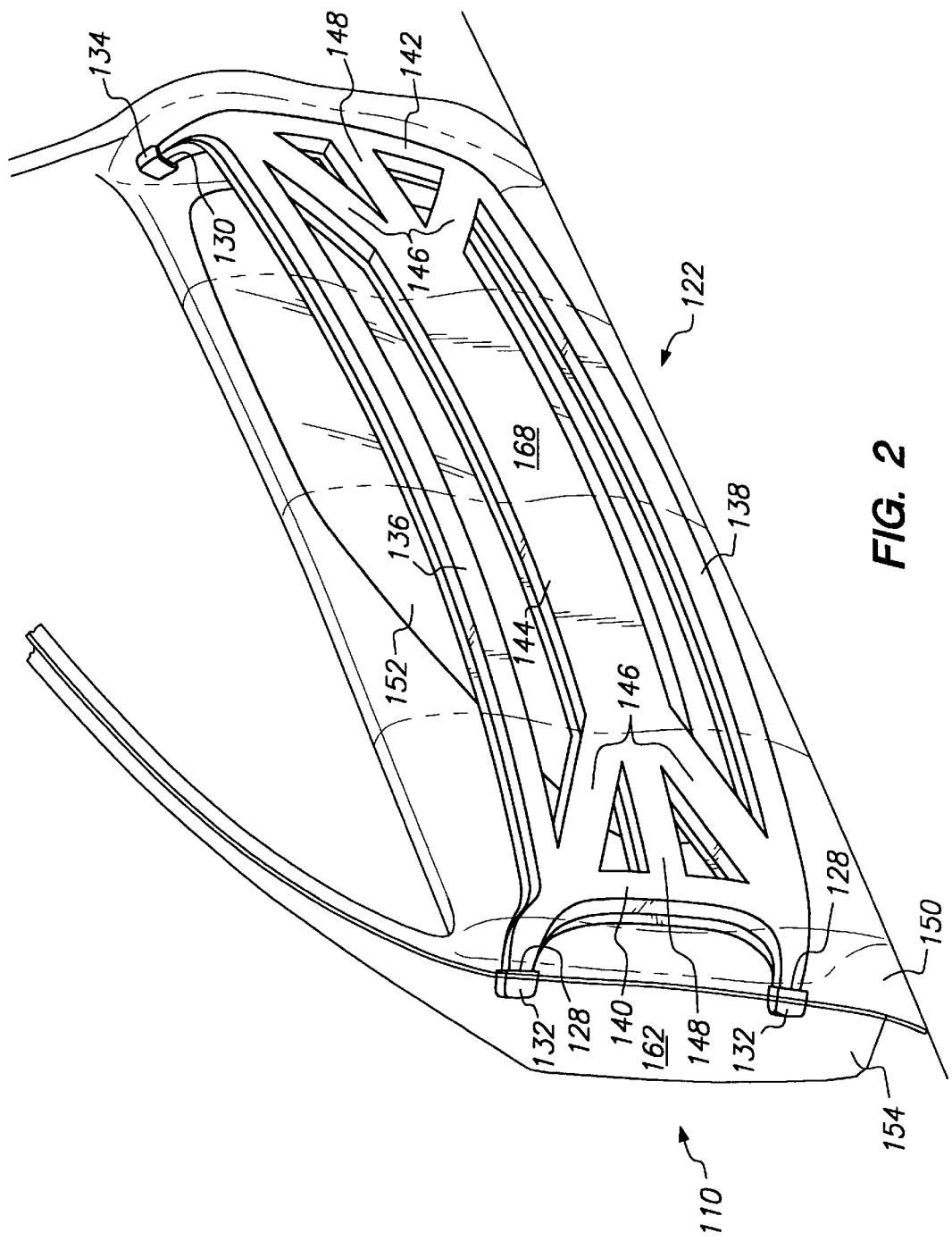
FIG. 2 is a perspective view showing a first embodiment of the invention with the door shown in the closed position.
Figure 3:
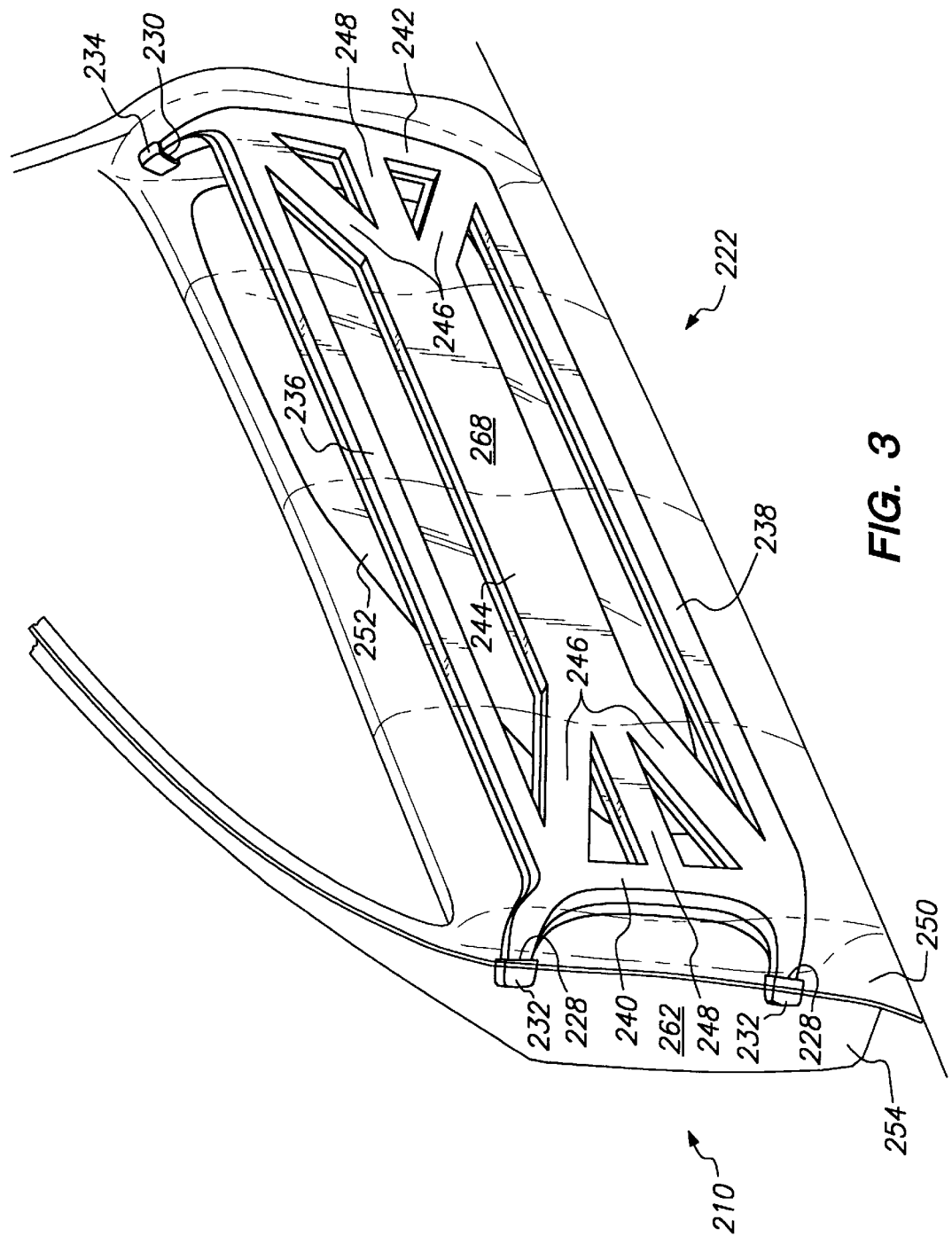
FIG. 3 is a perspective view showing a second embodiment with the door shown in the closed position.
Figure 4:
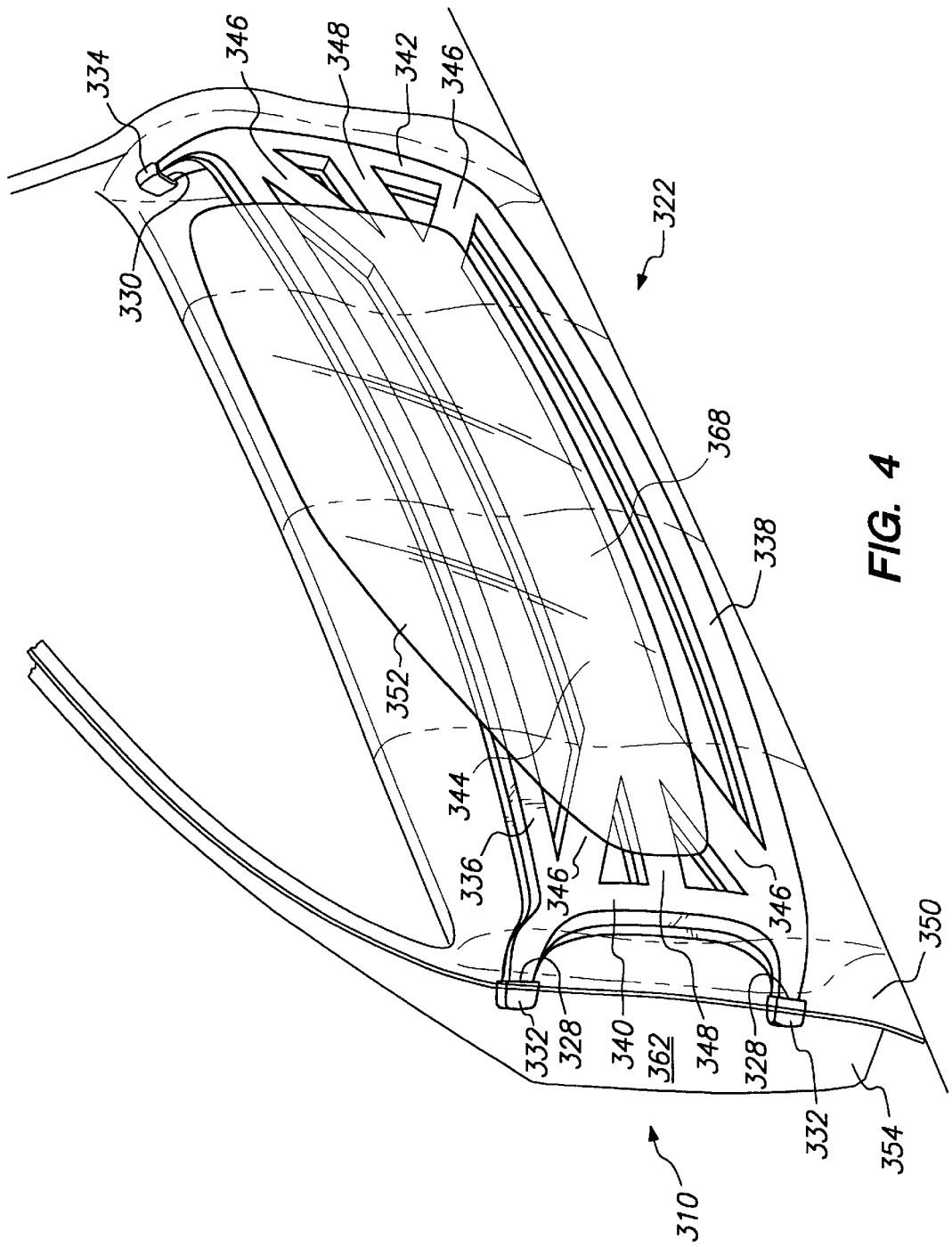
FIG. 4 is a perspective view showing a third embodiment with the door shown in the closed position.

The upper and lower front corners of beam 22 are provided with structural keys 28 projecting upward and inward toward the interior of vehicle body 12. Similarly, the upper and lower rear corners of beam 22 are also provided with rear structural keys 30 with similar orientations. Associated with each front structural key 28 is a mating front receptacle 32 located on the front portion of door jamb 20 adjacent to each front key 28. Likewise, associated with each rear structural key 30 is a mating rear receptacle 34 located on the rear portion of door jamb 20 adjacent to each rear key 30. Receptacles 32 and 34 are positioned such that they receive keys 28 and 30, respectively, and form a tight fit therewith, when door 10 is closed, as shown in FIGS. 2 through 4. Front and rear receptacles 32 and 34 are rigidly connected into the structural chassis of vehicle body 12. This arrangement allows beam 22 to be structurally integrated with the structural framework of vehicle body 12 when door 10 is closed. Beam 22 can then withstand greater impact forces by transferring those forces to body 10 through structural keys 28 and 30 and mating receptacles 32 and 34 during a collision.

In the preferred embodiment, door 10 is raised as it approaches the fully closed position such that keys 28 and 30 travel up into receptacles 32 and 34, and hinges 14 separate to allow all loads to be transmitted from door 10 to body 12 through keys 28 and 30 and receptacles 32 and 34 rather than through hinges 14. This concept and its implementation are fully described in U.S. patent application Ser. No. 08/577,649, now U.S. Pat. No. 5,806,917, again incorporated herein by reference. Preferably, rather than have the entire door raise up upon closing, just the rear of door 10 is raised, as will later be described below.

In order to reduce the weight of intrusion beam 22, beam 22 can be made up of a plurality of truss members with gaps therebetween rather than being a continuous plate-like member. In the preferred embodiment, beam 22 consists of an upper horizontal member 36 connecting upper keys 28 and 30, a lower horizontal member 38 connecting lower keys 28 and 30, a forward vertical member 40 connecting forward keys 28, a rear vertical member 42 connecting rear keys 30, a central member 44, four diagonal members 46 each connecting central member 44 to one of the keys 28 and 30, and two side members 48 each connecting central member 44 to a mid-portion of one of the vertical members 40 and 42. In an alternative embodiment (not shown), side members 48 are omitted.

With the above arrangement, a lightweight yet strong structure is provided to span across the entire door to prevent vehicle passengers from side intrusion. Because intrusion beam 22 is structurally tied to the vehicle body 12, it is stronger, lighter and less bulky than conventional side intrusion beams, and it covers more area.

Referring to FIGS. 2, 3 and 4, three specific embodiments are shown with reference numerals incremented by 100, 200, and 300, respectively. The corresponding elements of the three embodiments are identified as follows:

| Element | FIG. 1 | FIG. 2 | FIG. 3 | FIG. 4 |
| --- | --- | --- | --- | --- |
| door | 10 | 110 | 210 | 310 |
| intrusion beam | 22 | 122 | 222 | 322 |
| front keys | 28 | 128 | 228 | 328 |
| rear keys | 30 | 130 | 230 | 330 |
| front receptacles | 32 | 132 | 232 | 332 |
| rear receptacles | 34 | 134 | 234 | 334 |
| upr. horiz. member | 36 | 136 | 236 | 336 |
| lwr. horiz. member | 38 | 138 | 238 | 338 |
| fwd. vert. member | 40 | 140 | 240 | 340 |
| rear vert. member | 42 | 142 | 242 | 342 |
| central member | 44 | 144 | 244 | 344 |
| diagonal members | 46 | 146 | 246 | 346 |
| side members | 48 | 148 | 248 | 348 |
| door outer skin | 50 | 150 | 250 | 350 |
| window | 52 | 152 | 252 | 352 |
| door inner shell | 54 | 154 | 254 | 354 |
| door front surface | 62 | 162 | 262 | 362 |
| beam outer stamping | 68 | 168 | 268 | 368 |

In a first embodiment, shown in FIG. 2, intrusion beam 122 extends outward from keys 128 and 130 towards the outer skin 150 of door 110. Preferably, beam 122 is arched in both vertical and horizontal directions, yielding a beam 122 having its innermost points at the four corners and its outermost points at the center of central member 144. This outwardly arching shape provides an increased ability to resist inward deformation during a collision. In this embodiment, beam 122 occupies the space between retracted window 152 and outer door skin 150. The spaces between the truss members of beam 122 allow for the location and access of door components such as window drive and door lock mechanisms (not shown.)

Referring to FIG. 3, a second embodiment is shown. This embodiment is similar to the first with the intrusion beam 222 located outboard of window 252, but with beam 222 having a more planar shape. Such a shape may be necessitated by limited space between window 252 and door skin 250, or by other design or manufacturing constraints.

Referring to FIG. 4, a third embodiment is shown. In this embodiment, beam 322 has an arched shape and is located inboard of window 352. This embodiment is almost identical to the first embodiment shown in FIG. 2, except for the placement of the window. Such an arrangement might be necessitated by the geometry of a particular window path.

In an alternative embodiment (not shown), the intrusion beam could be arched inward to provide more strength than a flat beam. Preferably, beam 22 has as large an outward arch as possible and is located outboard as far as possible, such as in the first embodiment. This provides the strongest beam 22 possible. It also leaves as much room as possible between beam 22 and the passenger for locating energy absorbing material or for permitting beam 22 to deform inward somewhat to absorb some of the impact energy.

Figures 5, 6:
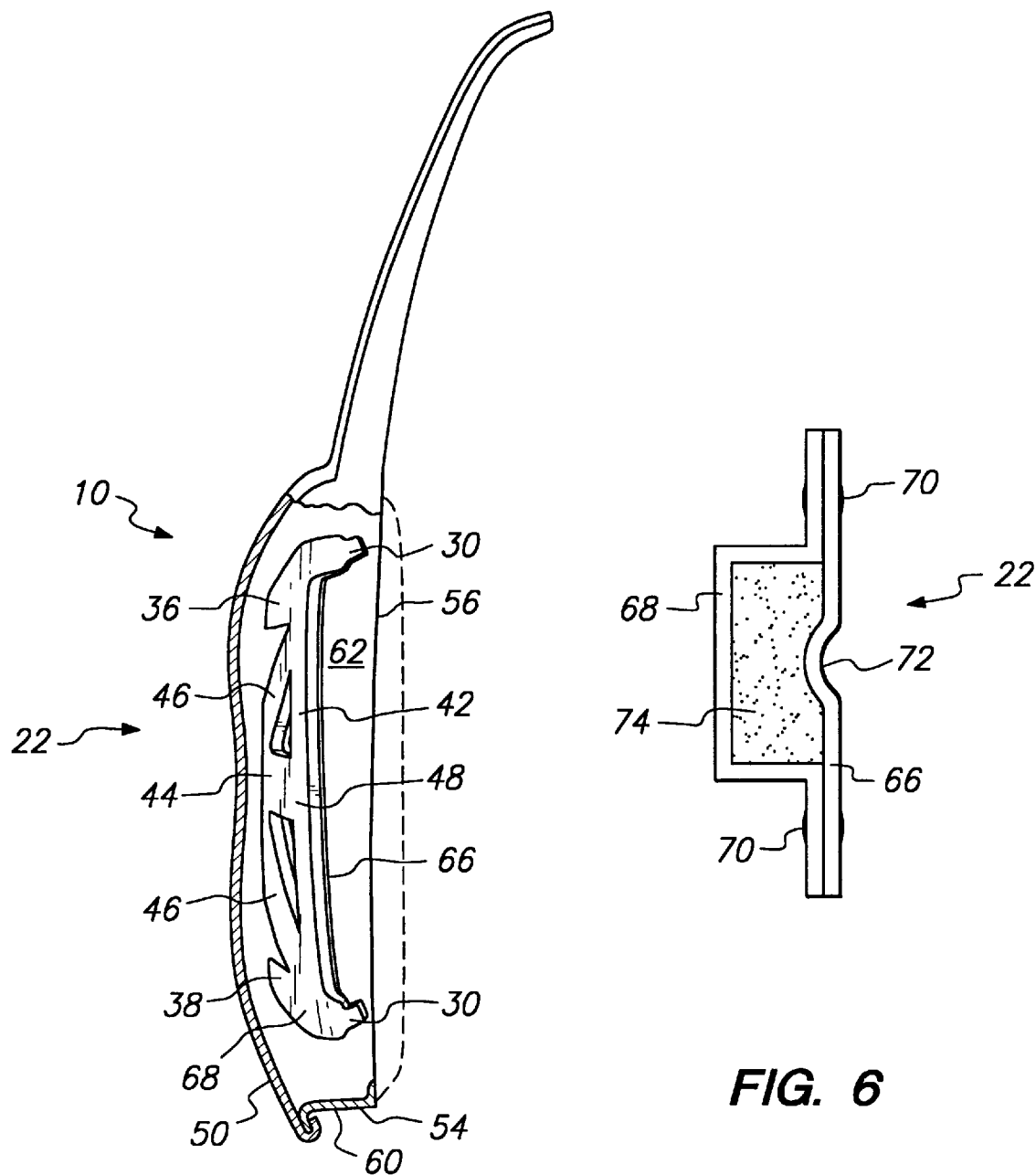
FIG. 5 is an end view showing the first embodiment with a portion of the trailing end of the door removed for clarity.
FIG. 6 is a cross-sectional view showing a typical section of the side intrusion beam.
Figure 7:
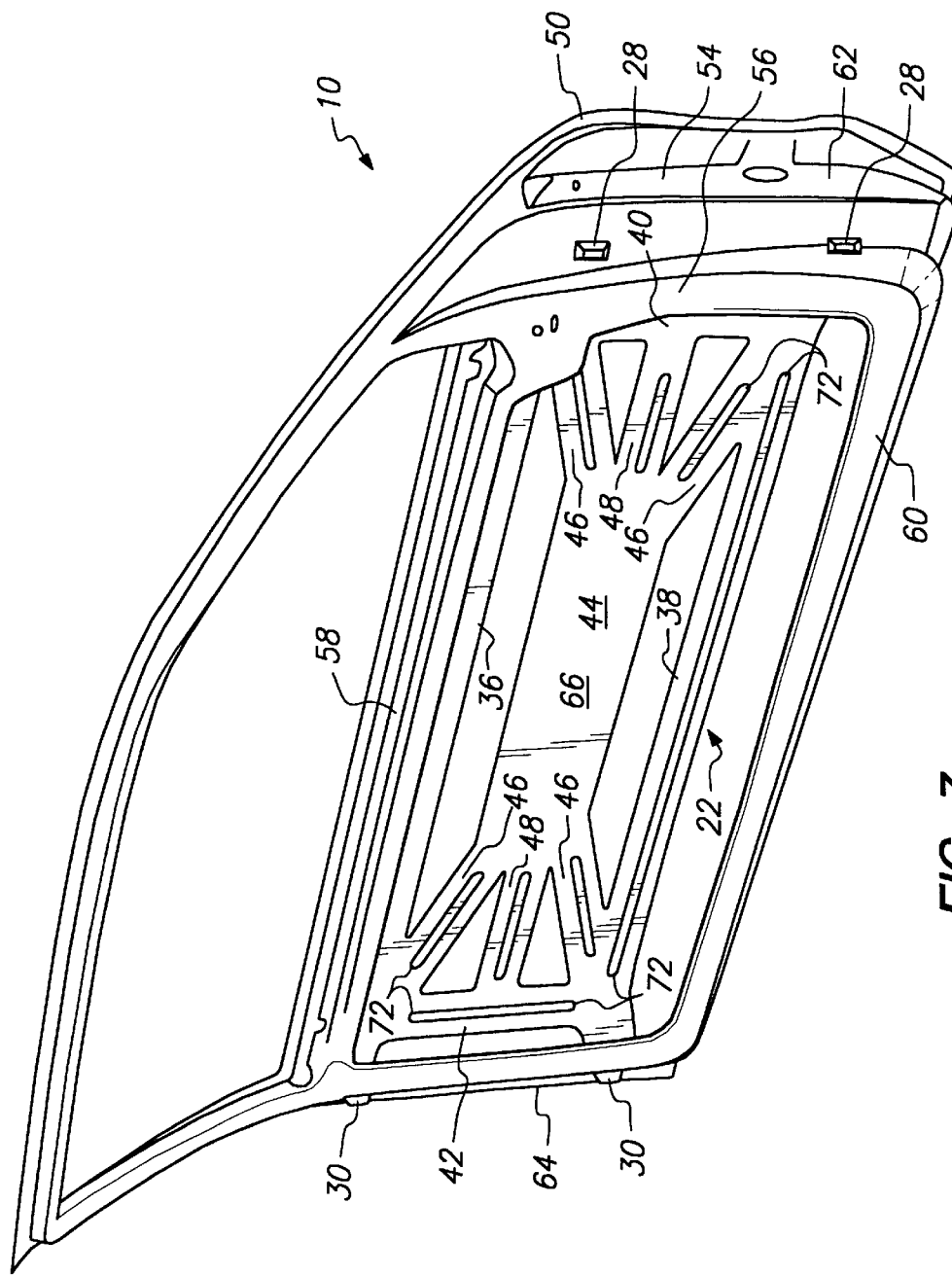
FIG. 7 is a perspective view showing the inboard side of the door and intrusion beam.

Referring to FIGS. 5 and 7, the construction of door 10 will be described. The overall structure of door 10 is of standard construction, having an outer skin 50 joined along its outer edges to an inner shell 54. Both outer skin 50 and inner shell 54 are sheet metal stampings, each with a cutout for receiving window 52 when extended in the closed position. Outer skin 50 is generally a curved sheet of steel which makes up the outer surface of door 10. The main portion of inner shell 54 is generally pan shaped and makes up the inside 56, top 58, bottom 60, front 62 and rear 64 surfaces of door 10. During assembly, the outer edges of skin 50 are bent around the outer edges of shell 54 and crimped to hold the two stampings 50 and 54 together.

On a conventional door, inside surface 56 spans across the entire inside of the door (with cutouts for door components), as depicted by the dashed line in FIG. 5. As shown in FIGS. 5 and 7, the present invention allows the majority of inside surface 56 to be omitted, leaving just a narrow edge around the border. Most of inside surface 56 can be omitted because intrusion beam 22 provides sufficient strength to replace this part of the door structure. The weight saved by omitting this portion of a conventional door offsets at least some of the weight added by installing intrusion beam 22. In fact, it is envisioned that the overall weight of door 10 designed to include side intrusion beam 22 will be less than that of a conventional door having a conventional tubular intrusion beam, and will clearly offer greater intrusion protection.

Door components (not shown) such as switches, door handle, window motor, upholstered panel, and the like can be mounted with bracketry or directly mounted to beam 22 or inner shell 54. The inside of door 10 may be filled with hardened foam for sound deadening and providing cushioning to the passenger for additional side impact protection.

As shown in FIG. 7, front keys 28 and rear keys 30 protrude through inner shell 54. During manufacture, keys 28 and 30 are attached to beam 22, as described below, which is then attached to door 10. Beam 22 can be attached to door 10 by being directly welded to inner shell 54, or removably connected with appropriate bracketry. Alternatively, beam 22 can be attached to inner shell 54 by welding keys 28 and 30 to inner shell 54. Whatever method is used to connect beam 22 to door 10, beam keys 28 and 30 are able to engage with and disengage from receptacles 32 and 34 when door 10 is closed and opened, respectively.

Referring to FIG. 6, the construction of intrusion beam 22 will be described. FIG. 6 shows a typical cross-section of beam 22, such as through the upper or lower horizontal members 36 and 38, the forward or rearward vertical members 40 and 42, or one of diagonal or side members 46 and 48, respectively. Preferably, beam 22 is constructed by joining two single sheet metal stampings: an inner stamping 66 and an outer stamping 68. Both stampings 66 and 68 preferably have a material thickness of about fifty-nine thousandths of an inch (0.059 in.) Both stampings are formed by removing cutouts between the portions that make up the truss members, bending each stamping 66 and 68 so that each truss member has a complex cross-section, and forming the entire stamping such that it has an overall arched shape. For added rigidity, channels 72 (shown also in FIG. 7) are formed in inner stamping 66 along the portions that make up the truss members. The two stampings 66 and 68 are then aligned and joined together with spot welds 70. The overall thickness of the two stampings when joined together is preferably about nine tenths of an inch (0.90). The voids between inner stamping 66 and outer stamping 68 can be injected with a light-weight, hardenable foam 74, as is well known in the art, to deaden sound and increase the bending strength of truss members 36 through 48.

Structural keys 28 and 30 can be made separately of solid material, such as of hardened steel, and then joined to the corners of intrusion beam 22, such as by welding. Alternatively, keys 28 and 30 can be created by forming them directly from stampings 66 and 68. With this latter fabrication process, welding and grinding would be performed on the structural key portions of stampings 66 and 68 to create smooth surfaces for mating with receptacles 32 and 34 (shown in FIG. 1.)

Alternate methods of constructing side intrusion beam 22 and/or structural keys 28 and 30 include, but are not limited to, using a single stamping, more than two stampings, using individual truss members fastened together, using carbon fiber, or using other advanced, high strength and light weight materials.

In all of the above embodiments, proper alignment between keys 28 and 30 and receptacles 32 and 34 can be achieved by accurately locating these members during vehicle manufacture, or by adjustably mounting beam 22 to door 10 and or adjustably mounting receptacles 32 and 34 to door jamb 20. Alternatively, receptacles 32 and 34 can be formed by injecting a hardenable resin into an oversized shell mounted to door jamb 20 when door 10 is closed and key 28 or 30 is protruding into the shell. This method is fully described in U.S. patent application Ser. No. 08/328,124, now abandoned, filed Oct. 20, 1994, incorporated herein by reference. Creating receptacles 32 and 34 in place by using a hardenable resin has the advantage of not only positioning receptacles 32 and 34 accurately with respect to keys 28 and 30, but also is a more cost effective and accurate way of manufacturing receptacles that fit the keys exactly. This is particularly appropriate for the front receptacles 32. Because these receptacles 32 are angled forward, tightly curved, are wedge shaped, and can be angled upward, they have a complex shape that is difficult to machine and position to make a tight fit with forward keys 28.

Figure 8:
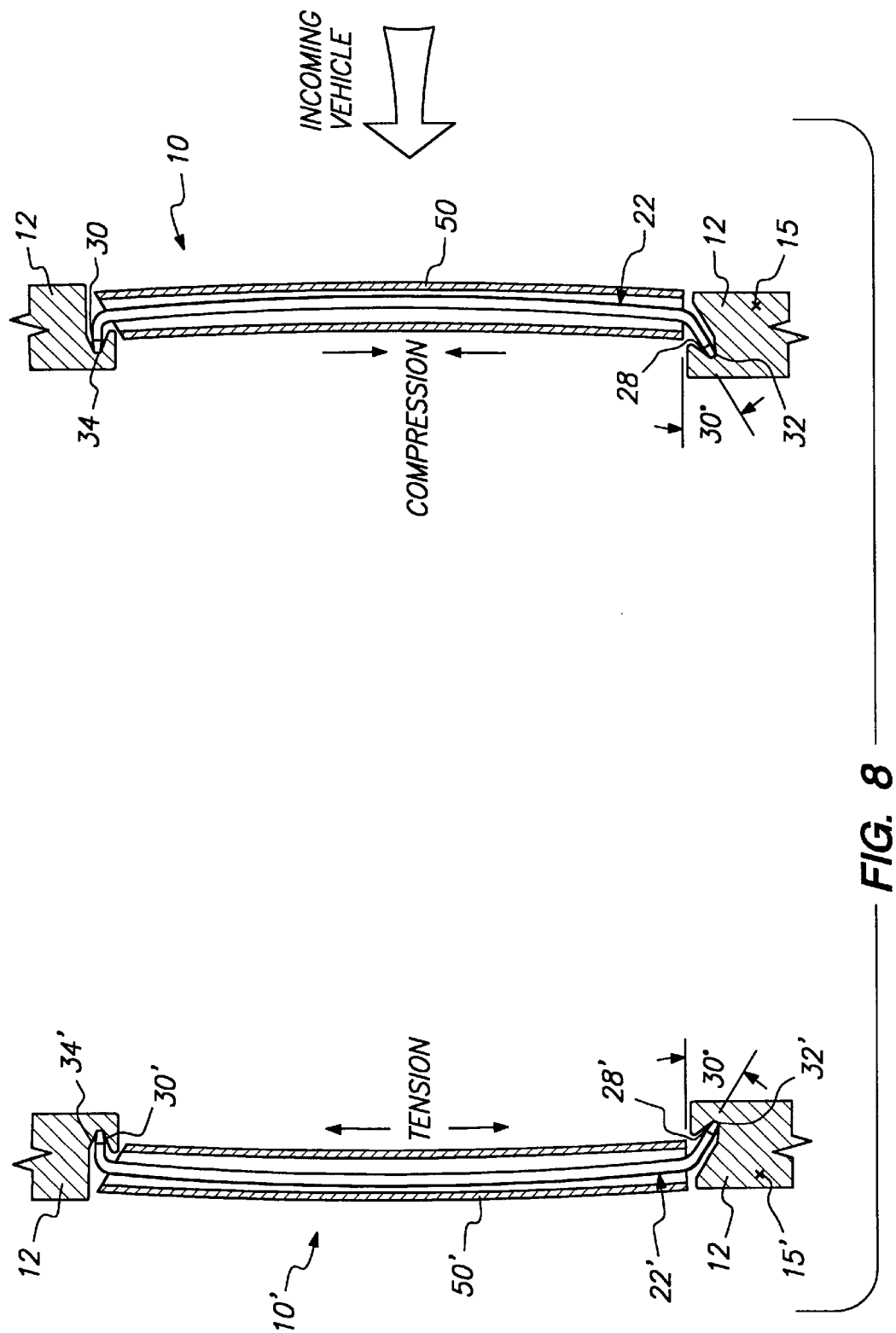
FIG. 8 is a top view schematically showing side intrusion beams in opposite doors (such as in a driver's door and a passenger's door.)

Referring to FIG. 8, the preferred orientation of keys 28 and 30 will be described. Ideally, keys 28 and 30 are not oriented directly inward toward the opposite side of the vehicle. If they were to be oriented directly inward, door hinges 14 and door catch 16 (shown in FIG. 1) would have to carry all of the load associated with holding keys 28 and 30 into receptacles 32 and 34. By orienting keys 28 and 30 so that they are not pointing directly inward, keys 28 and 30 are able to carry much of this outward load, which can be considerably high, especially during a collision. This allows hinges 14 and door catch 16 to carry very little or no load when door 10 is closed, which in turns eliminates undesirable bending moments placed on the load carrying keys 28 and 30, and on receptacles 32 and 34.

In the preferred embodiment, front keys 28 are angled forward 30 degrees from directly inward (as shown in FIG. 8), and rear keys 30 are angled upward 60 degrees from directly inward (as shown in FIG. 5.) In other words, each front key 28 lies in a horizontal plane, and the two rear keys 30 lie in a common vertical plane. These angled orientations give keys 28 and 30 the ability to resist forces that would otherwise move them outward. As mentioned previously above, U.S. patent application Ser. No. 08/577,649 describes these key orientation and force direction issues in more depth.

In order for keys 28 and 30 to properly engage with receptacles 32 and 34, respectively, when door 10 closes, keys 28 and 30 and receptacles 32 and 34 should be properly positioned with respect to hinge axis 15 (shown in FIG. 1.) In other words, each key 28 and 30 and each receptacle 32 and 34 should be lined up with the direction of door travel such that each is perpendicular to a radius drawn between hinge axis 15 and itself. Since in the preferred embodiment the front keys 28 and front receptacles 32 are oriented 30 degrees forward as described above, they should also be located 30 degrees inward with respect to hinge axis 15 when door 10 is closed. Similarly, rear keys 30 and rear receptacles 34 should be located directly rearward from hinge axis 15 since they are oriented directly inward when door 10 is closed and is viewed from above. In order for rear keys 30 to properly engage the upwardly inclined rear receptacles 34, the rear of door 10 should be lifted as door 10 approaches a fully closed position. Again, complete details on embodiments that illustrate how this is accomplished are fully described and shown in U.S. patent application Ser. No. 08/577,649.

As schematically shown in FIG. 8, intrusion beams are preferably located on both sides of the vehicle. Intrusion beam 22 is located on the driver's side of the vehicle while a similar beam 22', which is a mirror image of beam 22, is located on the passenger's side of the vehicle. Door 10', hinge axis 15', front key 28', rear key 30', front receptacle 32', rear receptacle 34', and outer door skin 50' all correspond to their mirror image counterparts located on the opposite side of the vehicle.

Most of the prior art side intrusion beams known to the applicant inhibit intrusion by being heavily constructed to resist bending. A few, like the present invention, tie the ends of the intrusion beam to opposite sides of the door jamb (i.e. to the vehicle body/chassis structure). However, these prior art devices only go into tension during a side impact collision, and the connections to the chassis only transmit tensile forces from the intrusion beam to the vehicle chassis. In contrast, in the preferred embodiment of the present invention, the intrusion beam 22 within the door being impacted goes into compression to resist intrusion, while the intrusion beam 22' on the opposite side of the vehicle goes into tension, as shown in FIG. 8, to keep that door from separating from its door opening. This prevents the vehicle being hit from "wrapping around" the front end of the incoming vehicle. Because of the arched structure of intrusion beam 22 and the design of keys 28 and 30 and receptacles 32 and 34, compressive, tensile, and even torsional and bending forces can be withstood by beam 22 and transmitted to the vehicle chassis.

The positions of keys 28 and 30 and receptacles 32 and 34 may be interchanged if desired. In other words, door 10 may be structurally integrated with body 12 by locating keys 28 and 30 on door jamb 20 and locating receptacles 32 and 34 on intrusion beam 22.

Although the inventive side intrusion beam 22 has been described above as being integrated with a conventional, hinged, side door, it can also be adapted for use on other types of doors. For instance, it may be used on all passenger doors (both front and rear), vertically sliding doors, rear minivan doors, utility vehicle lift-gates, tailgates, and cargo doors, trunks, sliding van doors, or any vehicle door opening where it is desired to limit intrusion into the vehicle during a collision. Preferably, the inventive intrusion beam is constructed to cover as much of the door opening as possible, and is rigidly tied into the main vehicle structure for added strength when the door is closed. Ideally, the beam is cruciform in shape to efficiently distribute the impact forces to four structural keys and receptacles.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed as the invention is:

1. An improved motor vehicle body comprising:
   a) a plurality of structural members defining a main body assembly having at least one door opening through a portion thereof;
   b) a door member mounted to the body assembly in association with said door opening for movement relative to the body assembly between an open position disposed outside the door opening and a closed position disposed substantially within the opening, the door member having a solid lower region and an upper region, the solid region having a perimeter which is received in said door opening when said door is in the closed position;

c) a plurality of mating pairs of inter-engageable connectors carried by the body assembly and the door member, each of said pairs comprising a key member carried by one of the door and body assembly and a mating socket member carried by the other of said door and body assembly for mutual engagement when the door member is in the closed position to structurally connect the door member to the main body assembly;

d) said pairs of connectors are disposed at the juncture of said solid door portion perimeter and the door opening, and said connectors are spaced both horizontally and vertically from each other to define a generally polygonal span therebetween covering a substantial portion of said door solid region; and e) a side intrusion resistant structural member located in the door member rigidly spanning between all of said inter-engageable connector members mounted in said door perimeter and across the middle portion of the door member, the structural member and the inter-engageable connectors cooperating to inhibit an inward deformation of the door member during a collision by anchoring the structural member to the main body assembly across the door opening when the door is in the closed position, to distribute forces generated in a collision through the interengageable connectors to the main body assembly.

2. An improved motor vehicle body assembly according to claim 1 wherein said polygonal span between said connectors has a plurality of corner portions at which the connectors are disposed.

3. An improved motor vehicle body according to claim 1 wherein the structural member spans horizontally across substantially the entire solid region of the door member.

4. An improved motor vehicle body according to claim 1 wherein the structural member has an overall arch shape in at least one of a horizontal and a vertical direction.

5. An improved motor vehicle body according to claim 4 wherein the main body assembly has an interior region in which vehicle occupants are located and the arched structural member has a concave side facing the interior occupant region.

6. An improved motor vehicle body according to claim 5 wherein said overall arch is in both a horizontal and vertical direction to generally form a dish shape.

7. An improved motor vehicle body according to claim 1 wherein the door member includes internal space suitable for mounting and receiving a retractable window panel and drive assembly therein, and wherein the structural member location is selected from one of an outboard and an inboard location relative to the window panel when the window panel is retracted within the door member.

8. An improved motor vehicle body according to claim 7 wherein said structural member includes a mounting portion for mounting door components.

9. An improved motor vehicle body according to claim 1 wherein the door member comprises a main shell structure having only one interior and one exterior vertical wall section, and wherein the structural member forms at least a portion of the one interior wall section.

10. An improved motor vehicle body according to claim 1 wherein the structural member comprises a plurality of beam members, each of the beam members having a substantial cross-section dimension comprising at least one bend, thereby providing a depth to the beam member for increased resistance to bending.

11. An improved motor vehicle body according to claim 10 wherein said structural member comprises two sheet metal stampings, at least one of said stampings being concave and said stampings being rigidly connected together and forming a cavity therebetween.

12. An improved motor vehicle body according to claim 1 wherein the structural member further comprises:

a) a central portion;

b) four diagonal beams each structurally interconnecting the central portion with one of the inter-engageable connector members;

c) two generally vertical beams each structurally interconnecting two adjacent interengageable connector members, each vertical beam having a mid-portion;

d) two generally horizontal beams each structurally interconnecting two adjacent inter-engageable connector members; and e) two generally horizontal central beams structurally interconnecting the central portion with the mid-portions of the two vertical beams.

13. An improved motor vehicle body according to claim 1 wherein each key member cooperatingly mates with the corresponding mating socket member to form a structural connection to transmit compressive, tensile, torsional and bending forces from the structural member through the keys and sockets to the body assembly during a collision.

14. An improved motor vehicle body according to claim 13 wherein the side intrusion-resistant structural member lies substantially outboard of the interengageable connector members.

15. An improved motor vehicle body according to claim 1 wherein the structural member is arched outwardly relative to the vehicle body assembly whereby the structural member goes into compression in response to external lateral impact to the door member during a collision.

16. An improved motor vehicle body according to claim 1 wherein the main body assembly further comprises a second door opening located on an opposite side of the main body assembly from the first door opening, and a second door member associated with the second door opening, the second door member being substantially structurally and functionally a mirror image of the first door member, the structural members of the first and second door members each being outwardly arched such that during a lateral impact the structural member nearest the impact goes into compression and the opposite structural member goes into tension.

17. A vehicle safety door for resisting collision intrusion to a vehicle comprising:

a) a main shell;

b) mounting members movably mounting the main shell to a vehicle body assembly for alternately covering and uncovering a door opening through the body assembly;

c) a structural member located within the main shell, the structural member having a generally polygonal shape with corner portions and a middle portion generally centrally located between the corner portions;

d) a plurality of disengageable first structural connectors members, each of said first connector members is disposed at one of the corner portions of the structural member, each of said first connector members matingly engaging a complementary shaped second connector member which is cooperatingly located on the door opening of the vehicle body assembly for structurally connecting the structural member to the vehicle body assembly when the main shell is covering the door opening;

e) the structural member, the disengageable first structural connector members and the complementary shaped second connector members interconnectingly cooperate to inhibit an inward deformation of the door during a collision by anchoring the structural member to the vehicle body assembly across the door opening when the door opening is covered by the main shell, to distribute forces generated in a collision through the first and second disengageable structural connector members to the vehicle body assembly.

18. A vehicle safety door according to claim 17 wherein the structural member has a generally quadrilateral shape with four corner portions.

19. A vehicle safety door according to claim 17 wherein the door comprises at least a solid lower portion and an upper portion, and wherein the structural member spans across substantially the entire solid portion.

20. A vehicle safety door according to claim 17 wherein the structural member has an overall arch shape in at least one of a horizontal and a vertical direction.

21. A vehicle safety door according to claim 20 wherein the vehicle body assembly has an interior region in which vehicle occupants are located and the arched structural member has a concave side facing the interior occupant region.

22. A vehicle safety door according to claim 21 wherein the structural member has an overall arch in both a horizontal and vertical direction to generally form a dish shape.

23. A vehicle safety door according to claim 17 wherein the main shell includes internal space suitable for mounting and receiving a retractable window panel and drive assembly therein, and wherein the structural member location is selected from one of an outboard and an inboard location relative to the window panel when the window panel is retracted within the main shell.

24. A vehicle safety door according to claim 23 wherein said structural member includes a mounting portion for mounting door components.

25. A vehicle safety door according to claim 17 wherein the main shell has only one interior and one exterior vertical wall section, and wherein the structural member is included in the one interior wall section.

26. A vehicle safety door according to claim 17 wherein the structural member comprises a plurality of beam members, each of the beam members having a substantial cross-section dimension comprising at least one bend, thereby providing a depth to the beam member for increased resistance to bending.

27. A vehicle safety door according to claim 17 wherein the structural member comprises a central portion and diagonal beams which structurally interconnect the central portion to the disengageable structural connectors.

28. A vehicle safety door according to claim 17 wherein the structural member further comprises:
a) a central portion;
b) four diagonal beams each structurally interconnecting the central portion with one of the disengageable structural connector members;
c) two generally vertical beams each structurally interconnecting two adjacent disengageable structural connector members, each vertical beam having a midportion;
d) two generally horizontal beams each structurally interconnecting two adjacent disengageable structural connector members; and
e) two generally horizontal central beams structurally interconnecting the central portion with the midportions of the two vertical beams.

29. A vehicle safety door according to claim 26 wherein said structural member comprises two sheet metal stampings, at least one of said stampings is concave and said stampings is rigidly connected together and forming a cavity therebetween.

30. A vehicle safety door according to claim 17 wherein one of each of said first connector members and the corresponding complementary shaped second connector member cooperatingly mates with the corresponding connector member to form a structural connection to transmit compressive, tensile, torsional and bending forces from the structural member through the first and second connector members to the body assembly during a collision.

31. A vehicle safety door according to claim 30 wherein the structural member lies substantially outboard of said first connector members.

32. In combination with a door member movably connected to a vehicle body assembly, which has a framework defining an interior volume, for movement between an open position disposed outside a door opening in the body assembly and a closed position disposed within the opening, an improved intrusion beam member for inhibiting intrusion of the door member into the body interior volume during a vehicle collision, the beam member comprising:
a) a structural frame for resisting inward bending, the frame having an overall quadrilateral shape with four corner portions and adapted to span across substantially all of a main portion of the door member; and
b) disengageable members located on the four corner portions which releasably engage complementary shaped members located on the body assembly to structurally anchor the four corner portions of the frame to the body assembly when the door member is in the closed position, to add strength to the frame for resisting intrusion.

33. In combination with a door member movably connected to a vehicle body assembly for movement relative thereto between an open position disposed outside a door opening in the body assembly and a closed position disposed within the opening, an improved intrusion beam member for inhibiting intrusion of the door member into the body assembly during a vehicle collision, wherein:
a) the beam member spans across the door opening and has an outwardly arched shape for resisting inward bending,
b) the beam member has disengageable members located on opposite distal ends thereof which releasably engage complementary shaped members located on the body assembly on opposite sides of the door opening to structurally anchor the distal ends of the beam member to the body assembly when the door member is in the closed position; and
c) one of each of the disengageable members and corresponding complementary shaped members generally receivingly surrounds the other to form a structural connection to transmit compressive, tensile, torsional and bending forces from the beam member through the disengageable members and complementary shaped members to the body assembly during a collision.

34. An improved motor vehicle body comprising:
a) a main body assembly having a first door opening through a portion thereof and a second door opening through a second portion thereof opposite the first door opening;
b) first and second door members each mounted to the body assembly for movement relative to the body assembly between an open position disposed outside one of the door openings and a closed position disposed within the opening, each of the door members having corner portions and a middle portion centrally located between the corner portions;
c) inter-engageable connections carried by the body assembly and each of the door members, each of the connections comprising a key carried by one of the door members and body assembly and a mating socket carried by the other of said door members and body assembly for mutual engagement with the key when the door member is in the closed position to structurally connect the door member to the main body assembly;
d) a structural member located on each of the door members rigidly spanning between the inter-engageable connections and across the middle portion of the door member, the connections being located at corner portions of the structural member, the structural member and the inter-engageable connections cooperating to inhibit an inward deformation of the door member during a collision by anchoring the structural member to the main body assembly across the door opening when the door is in the closed position, to distribute forces generated in a collision through the interengageable connections to the main body assembly; and
e) the structural members of the first and second door members each being outwardly arched such that during a lateral impact the structural member nearest the impact goes into compression and the opposite structural member goes into tension.

35. An improved motor vehicle body according to claim 2 wherein said polygonal span between pairs of connectors has a generally quadrilateral shape with four corner portions at which corners the connector members are disposed.

36. An improved motor vehicle body according to claim 35 wherein the structural member comprises a central portion and diagonal beams which structurally interconnect the central portion to the door inter-engageable connector members.

37. A vehicle safety door according to claim 31 wherein the structural member is arched outwardly relative to the vehicle body assembly whereby the member goes into compression in response to external lateral impact to the door during a collision.

* * * * *